US012292707B2

(12) United States Patent
Uno et al.

(10) Patent No.: US 12,292,707 B2
(45) Date of Patent: May 6, 2025

(54) IMAGE FORMING APPARATUS

(71) Applicant: KYOCERA Document Solutions Inc., Osaka (JP)

(72) Inventors: Koji Uno, Osaka (JP); Keisuke Oba, Osaka (JP); Yasuhiro Michishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/661,185

(22) Filed: May 10, 2024

(65) Prior Publication Data

US 2024/0385553 A1 Nov. 21, 2024

(30) Foreign Application Priority Data

May 19, 2023 (JP) ................................ 2023-082919

(51) Int. Cl.

*G03G 15/16* (2006.01)
*G03G 15/00* (2006.01)
*G03G 15/01* (2006.01)

(52) U.S. Cl.

CPC ....... *G03G 15/162* (2013.01); *G03G 15/0189* (2013.01); *G03G 15/1605* (2013.01); *G03G 15/1645* (2013.01); *G03G 15/5054* (2013.01); *G03G 2215/0609* (2013.01); *G03G 2215/1614* (2013.01)

(58) Field of Classification Search

CPC ............ G03G 15/162; G03G 15/0189; G03G 15/1605; G03G 15/1645; G03G 15/5054; G03G 2215/0609; G03G 2215/1614
See application file for complete search history.

(56) References Cited

U.S. PATENT DOCUMENTS

2004/0179872 A1 9/2004 Saito et al. .................. 399/302
2007/0269241 A1 11/2007 Sawai et al. .................. 399/299
2012/0328314 A1* 12/2012 Sugimoto ............ G03G 15/234 399/66
2017/0299987 A1* 10/2017 Sugimoto .......... G03G 15/1665
2020/0192251 A1* 6/2020 Saito .................... G03G 15/162

FOREIGN PATENT DOCUMENTS

JP 2004-271943 A 9/2004
JP 2007-310024 A 11/2007

* cited by examiner

*Primary Examiner* — Joseph S Wong
(74) *Attorney, Agent, or Firm* — Stein IP, LLC

(57) ABSTRACT

An image forming apparatus includes a plurality of image carriers, a charging device, an exposure device, a development device, and an intermediate transfer belt. The image carrier has a surface on which an amorphous silicon photosensitive layer is formed. The intermediate transfer belt is a plastic belt having a surface resistivity of 9.5 to 10.5 (log Ω/square). An offset amount of the primary transfer roller from the image carrier is 0 to 2 (mm), a contact surface pressure between the image carrier and the intermediate transfer belt is 0.5 to 1.5 ($gf/mm^2$), and a charge density of primary transfer current that flows when the primary transfer voltage is applied to the primary transfer roller is 0.016 to 0.040 ($\mu C/cm^2$).

3 Claims, 7 Drawing Sheets

IMAGE FORMING APPARATUS

INCORPORATION BY REFERENCE

This application is based upon and claims the benefit of priority from the corresponding Japanese Patent Application No. 2023-082919 filed May 19, 2023, the entire contents of which are hereby incorporated by reference.

BACKGROUND

The present disclosure relates to an intermediate transfer type image forming apparatus, in which a toner image formed on an image carrier such as a photosensitive drum is transferred onto an intermediate transfer belt.

Conventionally, there is known an intermediate transfer type image forming apparatus including an endless intermediate transfer belt rotated in a predetermined direction, and a plurality of image forming units disposed along the intermediate transfer belt, in which the image forming units sequentially overlay toner images of individual colors onto the intermediate transfer belt as primary transfer, and then the toner images are secondarily transferred onto a recording medium such as a paper sheet by a secondary transfer roller.

In the intermediate transfer type image forming apparatus, if a plastic intermediate transfer belt is used, it is difficult to get close contact between a recessed part of the paper sheet and the belt in the secondary transfer, because the plastic belt is more rigid than an elastic belt. At the recessed part of the paper sheet, a gap between the paper sheet and the belt increases so that a transfer electric field is weakened, and hence secondary transferability is lowered.

SUMMARY

An image forming apparatus according to one aspect of the present disclosure includes a plurality of image carriers, a charging device, an exposure device, a development device, an intermediate transfer belt, a plurality of primary transfer rollers, a transfer voltage power supply, and a secondary transfer roller. The image carrier has a surface on which an amorphous silicon photosensitive layer is formed. The charging device charges the surface of the image carrier. The exposure device exposes the surface of the image carrier charged by the charging device, so as to form an electrostatic latent image on the surface of the image carrier. The development device develops the electrostatic latent image formed on the surface of the image carrier into a toner image, using developer containing toner. The toner images formed on the image carriers are primarily transferred sequentially onto the intermediate transfer belt. The primary transfer roller is pressed to contact the image carrier via the intermediate transfer belt. The transfer voltage power supply applies the primary transfer roller with a primary transfer voltage having a polarity opposite to that of the toner image. The secondary transfer roller secondarily transfers the toner images, which have been primarily transferred onto the intermediate transfer belt, to the recording medium. The intermediate transfer belt is a plastic belt having a surface resistivity of 9.5 to 10.5 (log Ω/square). An offset amount of the primary transfer roller from the image carrier is 0 to 2 (mm), a contact surface pressure between the image carrier and the intermediate transfer belt is 0.5 to 1.5 (gf/mm$^2$), and a charge density of primary transfer current that flows when the primary transfer voltage is applied to the primary transfer roller is 0.016 to 0.040 (μC/cm$^2$).

DETAILED DESCRIPTION

Figure 1:
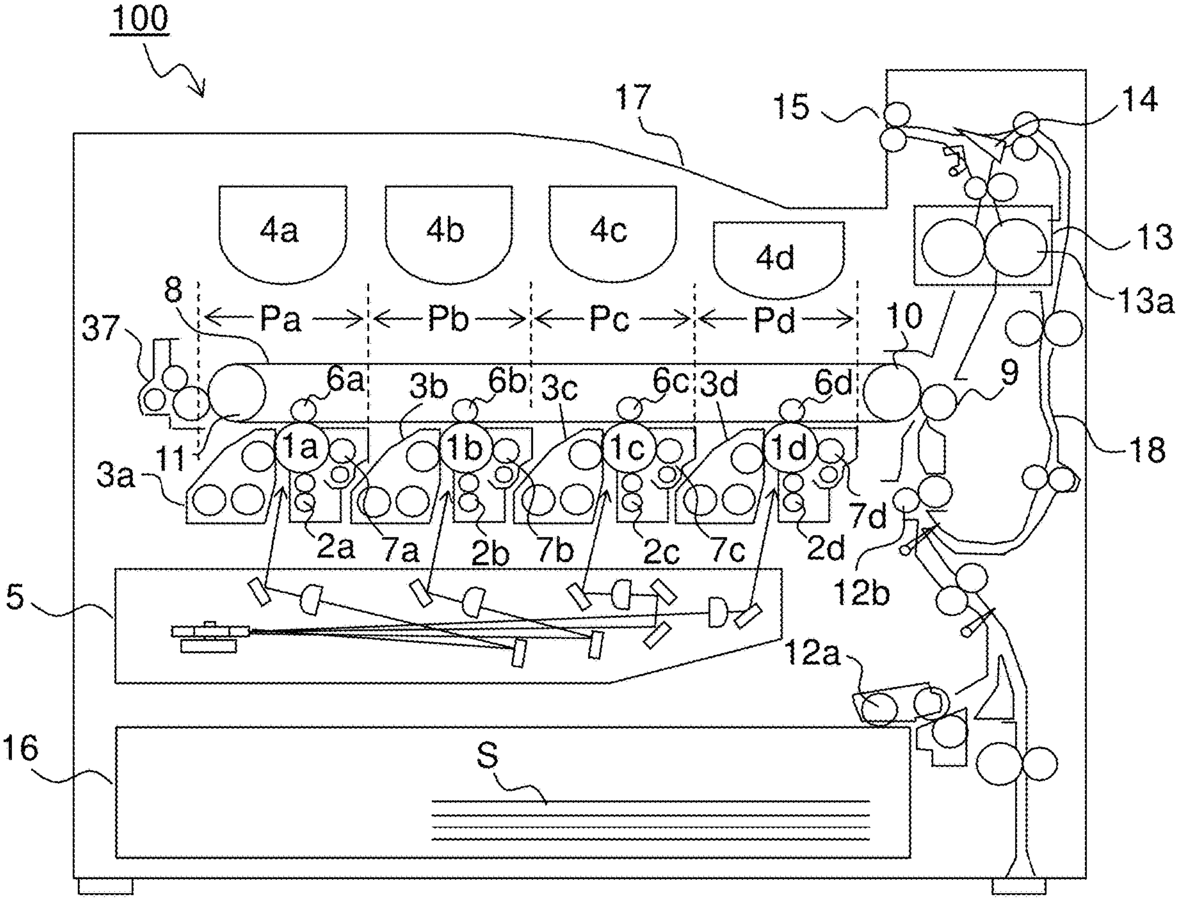
FIG. 1 is a schematic cross-sectional view illustrating an overall structure of an image forming apparatus according to an embodiment of the present disclosure.
Figure 2:
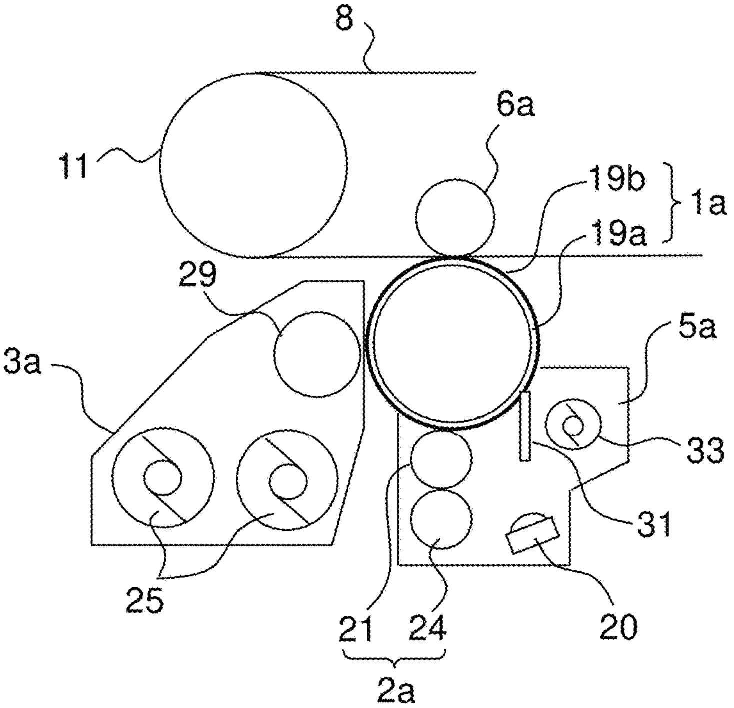
FIG. 2 is a partial enlarged view of an image forming unit and its vicinity in FIG. 1.

Hereinafter, with reference to the drawings, an embodiment of the present disclosure is described in detail. FIG. 1 is a schematic diagram illustrating a structure of an image forming apparatus 100 according to an embodiment of the present disclosure. FIG. 2 is an enlarged view of an image forming unit Pa and its vicinity in FIG. 1. Note that image forming units Pb to Pd have basically the same structure as that of the image forming unit Pa, and therefore descriptions thereof are omitted.

In a main body of the image forming apparatus 100 (e.g., a color printer), four image forming units Pa, Pb, Pc, and Pd are disposed in order from an upstream side in a conveying direction (the left side in FIG. 1). These image forming units Pa to Pd correspond to four images of different colors (cyan, magenta, yellow, and black colors), and sequentially form cyan, magenta, yellow, and black images, by charging, exposing, developing, and transferring steps.

These image forming units Pa to Pd are respectively provided with photosensitive drums 1*a*, 1*b*, 1*c*, and 1*d*, which carry visual images (toner images) of individual colors. Furthermore, an intermediate transfer belt 8 is disposed adjacent to the image forming units Pa to Pd, and is stretched around a plurality of rollers including a drive roller 10 and a tension roller 11, so as to rotate in a counterclockwise direction in FIG. 1. As illustrated in FIG. 2, around the photosensitive drum 1*a*, there are a charging device 2*a*, a development device 3*a*, a cleaning device 7*a*, and a charge elimination lamp 20, which are disposed along a drum rotation direction (a clockwise direction in FIG. 2), and a primary transfer roller 6*a* is disposed via the intermediate transfer belt 8.

The photosensitive drum 1*a* to 1*d* is constituted of a conductive base 19*a* and a photosensitive layer 19*b* formed on a surface of the conductive base 19*a*. In this embodiment, an amorphous silicon photosensitive layer is formed as the photosensitive layer 19*b* on the surface of the cylindrical conductive base 19*a* made of aluminum.

The charging device 2*a* to 2*d* includes a charging roller 21 that contacts the photosensitive drum 1*a* to 1*d* and applies a charging voltage (a DC voltage plus an AC voltage) to the surface of the drum, and a charge cleaning roller 24 for cleaning the charging roller 21.

The development devices 3*a* to 3*d* are a two-component developing type, each of which includes two stirring conveyance screws 25 and a developing roller 29, and are respectively filled with a predetermined amount of two-component developer containing cyan, magenta, yellow, and black color toner and magnetic carrier. Using the two-component developer, a magnetic brush is formed on a surface of the developing roller 29, and the developing roller 29 is applied with a development voltage having the same polarity as the toner (e.g., a positive polarity), and in this state the magnetic brush is allowed to contact the surface of the photosensitive drum 1*a* to 1*d*, so that the toner adheres to form the toner image. Note that, if a ratio of the toner in the two-component developer filled in the development device 3*a* to 3*d* becomes lower than a specified value, due to formation of the toner image, the toner is replenished from a toner container 4*a* to 4*d* to the development device 3*a* to 3*d*.

When image data is input from a host device such as a personal computer, a main motor 40 (see FIG. 5) first starts to drive the photosensitive drums 1*a* to 1*d* to rotate. In addition, a belt drive motor 41 (see FIG. 5) starts to drive the intermediate transfer belt 8 to rotate. Next, the charging devices 2*a* to 2*d* respectively charge the surfaces of the photosensitive drums 1*a* to 1*d* uniformly at the same polarity as the toner (e.g., the positive polarity). Next, an exposure device 5 emits light in accordance with the image data, so as to form electrostatic latent images whose charges are decreased according to the image data, on the photosensitive drums 1*a* to 1*d*, respectively. Then, the development devices 3*a* to 3*d* supply the toner to the photosensitive drums 1*a* to 1*d*, respectively, and the toner is adhered in an electrostatic manner so that the toner images are formed corresponding to the electrostatic latent images.

Further, the primary transfer roller 6*a* to 6*d* applies a predetermined primary transfer electric field between the primary transfer roller 6*a* to 6*d* and the photosensitive drum 1*a* to 1*d*. In this way, the yellow, cyan, magenta, and black toner images on the photosensitive drums 1*a* to 1*d* are primarily transferred onto the intermediate transfer belt 8. After the primary transfer, the toner and the like remaining on the surfaces of the photosensitive drums 1*a* to 1*d* are removed by the cleaning devices 7*a* to 7*d*, respectively. After the primary transfer, residual charges remaining on the surfaces of the photosensitive drums 1*a* to 1*d* are removed by the charge elimination lamp 20.

Paper sheets S to which the toner images are transferred are stored in a paper sheet cassette 16 disposed in a lower part of the image forming apparatus 100. The paper sheet S is conveyed at a predetermined timing by a sheet feed roller 12*a* and a registration roller pair 12*b*, to a nip part (secondary transfer nip part) between the intermediate transfer belt 8 and a secondary transfer roller 9 disposed adjacent to the intermediate transfer belt 8. The secondary transfer roller 9 secondarily transfers the toner images on the intermediate transfer belt 8 onto the paper sheet S, which is conveyed to a fixing unit 13.

The paper sheet S conveyed to the fixing unit 13 is heated and pressed by a fixing roller pair 13*a*, and the toner images are fixed to a surface of the paper sheet S so that a predetermined full color image is formed. The paper sheet S with the full color image formed is discharged by a discharge roller pair 15 onto a discharge tray 17 as it is (or after being conveyed by a branch unit 14 to a reverse conveying path 18 and after images are formed on both sides).

Figure 3:
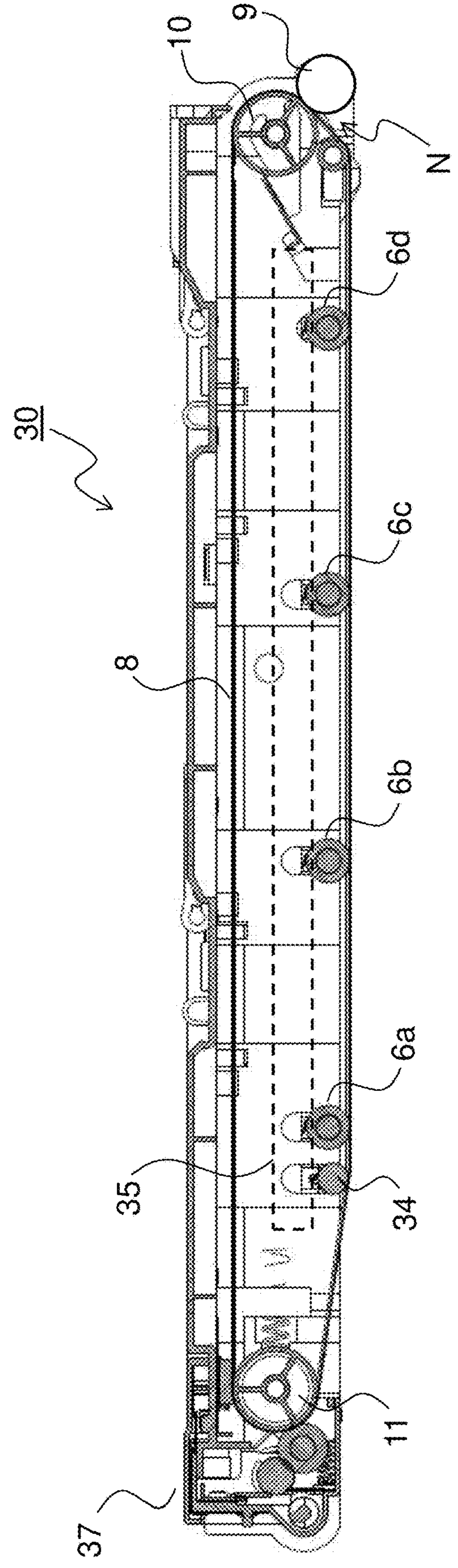
FIG. 3 is a cross-sectional side view of an intermediate transfer unit mounted in the image forming apparatus.

FIG. 3 is a cross-sectional side view of an intermediate transfer unit 30 mounted in the image forming apparatus 100. As illustrated in FIG. 3, the intermediate transfer unit 30 includes the intermediate transfer belt 8 stretched around the drive roller 10 and the tension roller 11, the primary transfer rollers 6*a* to 6*d* that respectively contact the photosensitive drums 1*a* to 1*d* via the intermediate transfer belt 8, and a pressure switching roller 34.

The intermediate transfer belt 8 is a plastic belt made of polyimide resin as a main component, and has a thickness of 40 to 100 (μm) and a Young's modulus of 3,000 to 6,000 (MPa).

The drive roller 10 and the tension roller 11 are disposed on a downstream side and an upstream side, respectively, in a traveling direction of a conveying surface (lower surface) of the intermediate transfer belt 8. At a position facing the tension roller 11, there is disposed a belt cleaning unit 37 for removing the toner remaining on the surface of the intermediate transfer belt 8. The secondary transfer roller 9 is pressed to contact the drive roller 10 via the intermediate transfer belt 8, and forms a secondary transfer nip part N.

The intermediate transfer unit 30 is provided with a roller contacting and separating mechanism 35, which includes a pair of support members (not shown), which support both ends of rotation shafts of the primary transfer rollers 6*a* to 6*d* and the pressure switching roller 34 in a rotatable manner, and in a movable manner perpendicularly to the traveling direction of the intermediate transfer belt 8 (in the up and down direction in FIG. 3), and a drive means (not shown) that reciprocatingly moves the primary transfer rollers 6*a* to 6*d* and the pressure switching roller 34 in the up and down direction. The roller contacting and separating mechanism 35 can switch the four primary transfer rollers 6*a* to 6*d* among a color mode in which they are respectively pressed to contact the photosensitive drums 1*a* to 1*d* (see FIG. 1) via the intermediate transfer belt 8, a monochrome mode in which only the primary transfer roller 6*d* is pressed to contact the photosensitive drum 1*d* via the intermediate transfer belt 8, and a retraction mode in which all the four primary transfer rollers 6*a* to 6*d* are separated from the photosensitive drums 1*a* to 1*d*.

Figure 4:
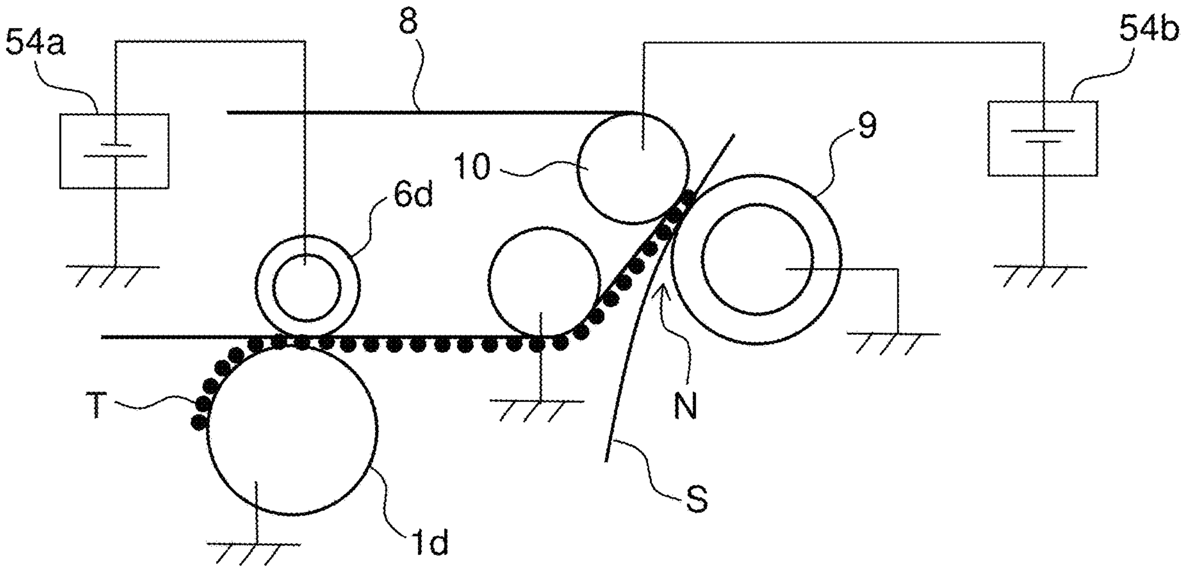
FIG. 4 is a partial enlarged view of a primary transfer roller, a secondary transfer nip part, and their vicinity of the intermediate transfer unit.

FIG. 4 is a partial enlarged view of the primary transfer roller 6*d*, the secondary transfer nip part N, and their vicinity of the intermediate transfer unit 30. With reference to FIG. 4, the primary transfer and the secondary transfer of the toner images are described. Note that FIG. 4 illustrates positively charged toner whose charge polarity is positive (plus).

As illustrated in FIG. 4, the primary transfer roller 6*a* to 6*d* is connected to a primary transfer voltage power supply 54*a*. The drive roller 10 (secondary transfer opposed roller) is connected to a secondary transfer voltage power supply 54*b*. When a control unit 90 (see FIG. 5) receives an image formation command, the electrostatic latent image is formed on the surface of the photosensitive drum 1*a* to 1*d*, and the development device 3*a* to 3*d* (see FIG. 2) supplies toner T so that the toner image is formed. By the rotation of the photosensitive drum 1*a* to 1*d*, the toner image formed on the photosensitive drum 1*a* to 1*d* is moved to a part facing the primary transfer roller 6*a* to 6*d* (a primary transfer nip part).

The primary transfer roller 6a to 6d is applied with a primary transfer voltage of a negative polarity (minus) from the primary transfer voltage power supply 54a. In this way, the toner image on the photosensitive drum 1a to 1d is attracted by the primary transfer roller 6a to 6d at the part facing the primary transfer roller 6a to 6d (the primary transfer nip part), and is primarily transferred onto the intermediate transfer belt 8. The toner image primarily transferred onto the intermediate transfer belt 8 is moved to the secondary transfer nip part N, by the rotation of the intermediate transfer belt 8.

The drive roller 10 is applied with a secondary transfer voltage having the positive polarity (plus) from the secondary transfer voltage power supply 54b. In this way, the toner image on the intermediate transfer belt 8 is conveyed to the secondary transfer nip part N, and is transferred onto the paper sheet S that passes through the secondary transfer nip part N, by a potential difference between the drive roller 10 applied with the secondary transfer voltage and the secondary transfer roller 9 connected to the ground (earth).

Figure 5:
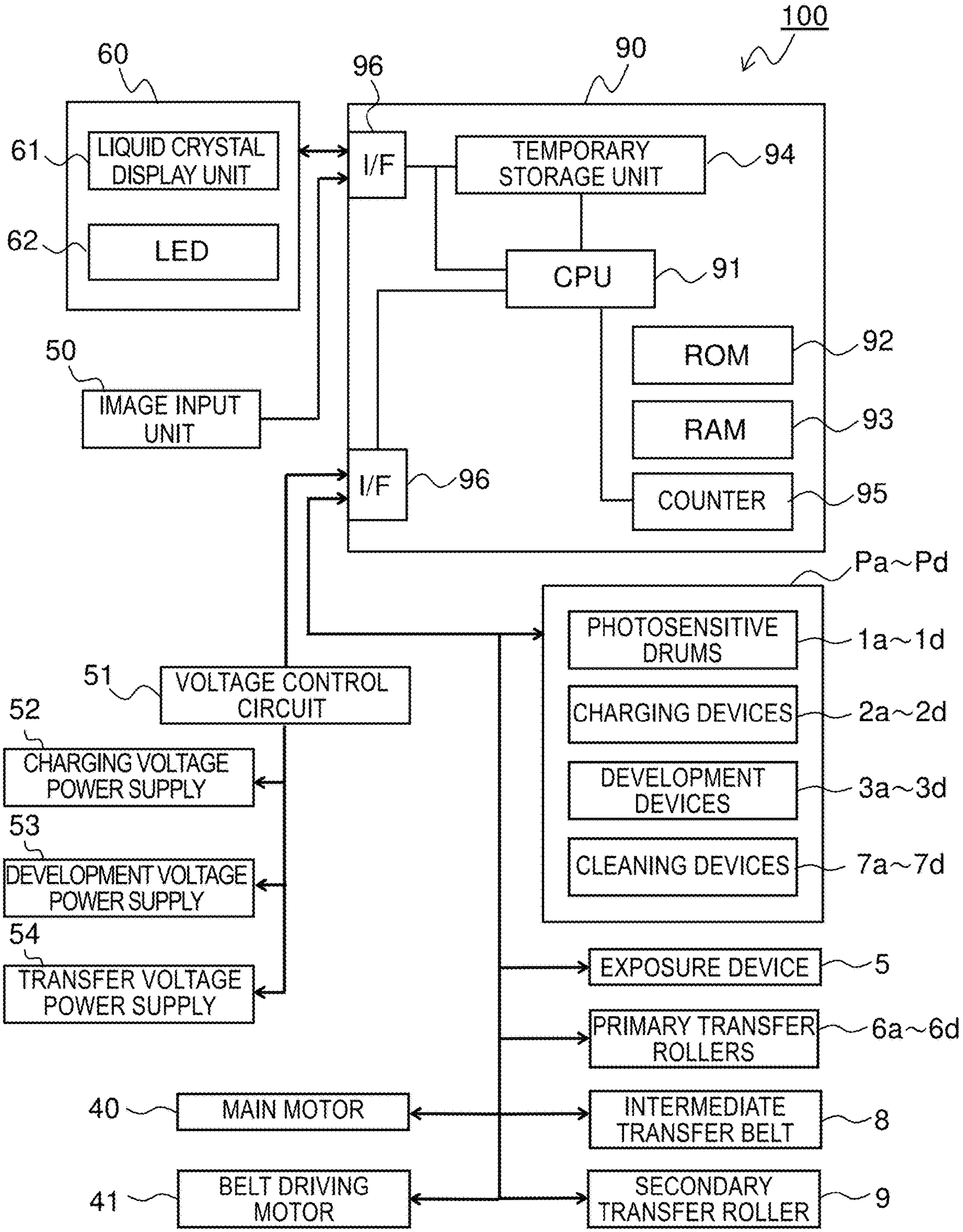
FIG. 5 is a block diagram illustrating an example of a control path of the image forming apparatus.

Next, a control path of the image forming apparatus 100 of the present disclosure is described. FIG. 5 is a block diagram illustrating an example of the control path used in the image forming apparatus 100 of the present disclosure. Note that the control path of the entire image forming apparatus 100 is complicated, because of various controls of individual units when using the image forming apparatus 100. Therefore, in this description, a part of the control path, which is necessary for implementing the present disclosure, is mainly described.

The control unit 90 includes at least a central processing unit (CPU) 91, a read only memory (ROM) 92 that is a storage unit dedicated to reading, a random access memory (RAM) 93 that is a readable and writable storage unit, a temporary storage unit 94 that temporarily stores image data and the like, a counter 95 that accumulates and counts the number of printed sheets, and a plurality of (e.g., two) interfaces (I/Fs) 96 for transmitting control signals to individual devices in the image forming apparatus 100 and receiving input signals from an operation unit 60. In addition, the control unit 90 can be disposed at any place in the main body of the image forming apparatus 100.

The ROM 92 stores data or the like that is not changed during use of the image forming apparatus 100, such as a control program for the image forming apparatus 100, numeric values or the like necessary for control, and the like. The RAM 93 stores necessary data during control of the image forming apparatus 100, data temporarily necessary for control of the image forming apparatus 100, and the like.

In addition, the control unit 90 sends control signals from the CPU 91 via the I/F 96 to individual sections and devices in the image forming apparatus 100. In addition, the individual sections and devices send signals indicating their states or input signals to the CPU 91 via the I/F 96. The individual sections and devices controlled by the control unit 90 include, for example, the image forming units Pa to Pd, a exposure device 5, the primary transfer rollers 6a to 6d, the secondary transfer roller 9, the main motor 40, the belt drive motor 41, an image input unit 50, a voltage control circuit 51, the operation unit 60, and the like.

The image input unit 50 is a reception unit that receives image data sent from the personal computer or the like to the image forming apparatus 100. An image signal input from the image input unit 50 is converted into a digital signal and then is sent out to the temporary storage unit 94 via the I/F 96.

The voltage control circuit 51 is connected to a charging voltage power supply 52, a development voltage power supply 53, and a transfer voltage power supply 54, and controls these power supplies to work in accordance with output signals from the control unit 90. By the control signal from the voltage control circuit 51, the charging voltage power supply 52 applies the charging voltage to the charging roller 21 in the charging device 2a to 2d. The development voltage power supply 53 applies the development voltage, in which a development AC voltage is superimposed on a development DC voltage, to the developing roller 29 in the development device 3a to 3d. The transfer voltage power supply 54 includes the primary transfer voltage power supply 54a, which applies a predetermined primary transfer voltage to the primary transfer roller 6a to 6d, and the secondary transfer voltage power supply 54b, which applies a predetermined secondary transfer voltage to the drive roller 10 (see FIG. 4 for both).

The operation unit 60 is provided with a liquid crystal display unit 61, and an LED 62 that indicates various states. A user operates a stop/clear button of the operation unit 60 so as to stop image formation, and operates a reset button so as to reset various settings of the image forming apparatus 100 to a default state. The liquid crystal display unit 61 indicates a state of the image forming apparatus 100, and displays a status of image formation or the number of copies to be printed. Various settings of the image forming apparatus 100 are made via a printer driver of the personal computer.

Next, the primary transfer rollers 6a to 6d and the intermediate transfer belt 8 provided to the intermediate transfer unit 30 are described. As described above, in the case of using a plastic belt as the intermediate transfer belt 8, a secondary transfer defect tends to occur in the secondary transfer nip part N.

Figure 6A:
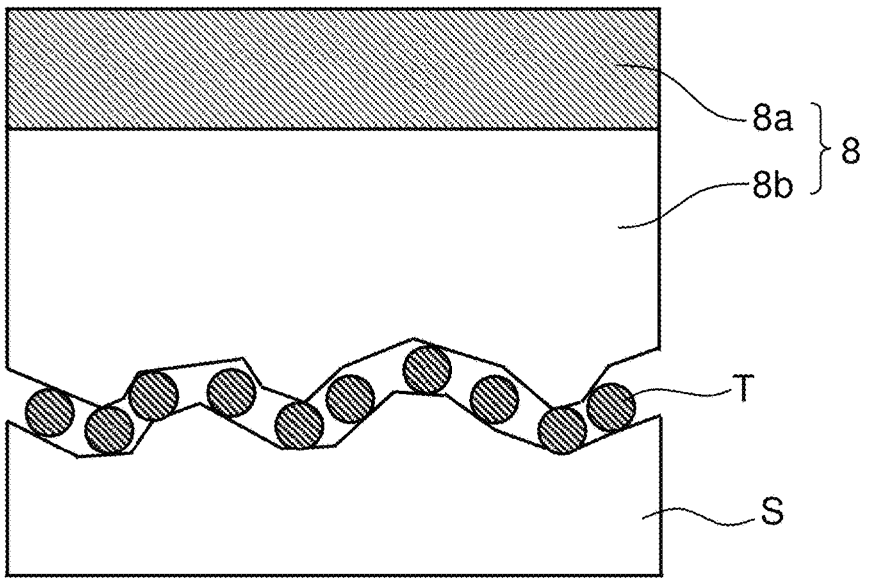
FIG. 6A is a schematic diagram illustrating transferability in a case where an elastic belt is used as an intermediate transfer belt.
Figure 6B:
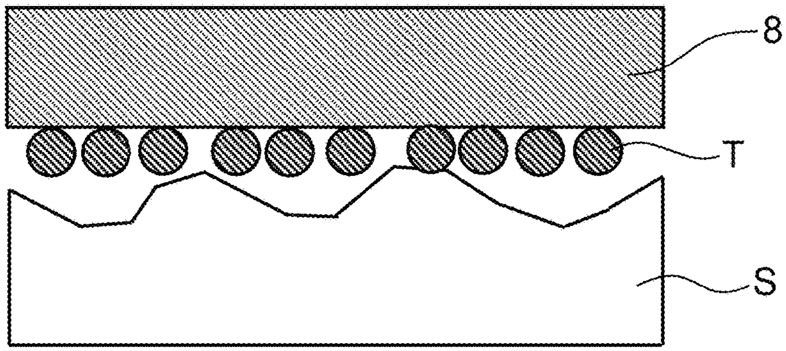
FIG. 6B is a schematic diagram illustrating transferability in a case where a plastic belt is used as the intermediate transfer belt.

FIGS. 6A and 6B are schematic diagrams illustrating a difference of secondary transferability between a case where an elastic belt is used as the intermediate transfer belt 8, and a case where a plastic belt is used as the same. FIG. 6A illustrates the case where an elastic belt is used for secondarily transfer onto the paper sheet S, while FIG. 6B illustrates the case where a plastic belt is used for secondarily transfer onto the paper sheet S.

As illustrated in FIG. 6A, the intermediate transfer belt 8 that is an elastic belt has a lamination structure of a plastic base layer 8a for stabilizing belt size and an elastic layer 8b for carrying the toner T. In the secondary transfer nip part N, when the intermediate transfer belt 8 carrying the toner T and the paper sheet S are opposed and pressed to each other, the elastic layer 8b is deformed along bumps and dips of the paper sheet S. Therefore, there is no gap between the toner T on the intermediate transfer belt 8 and the paper sheet S, and the transfer electric field becomes uniform so that the toner T can easily move from the intermediate transfer belt 8 to the paper sheet S.

As illustrated in FIG. 6B, as for the intermediate transfer belt 8 that is a plastic belt, the intermediate transfer belt 8 carrying the toner T does not deform along bumps and dips of the paper sheet S. Therefore, there is a gap between the toner T and the paper sheet S. In the gap, the transfer electric field is weakened so that the toner T can hardly move from the intermediate transfer belt 8 to the paper sheet S.

If the secondary transfer voltage that is applied to the drive roller 10 is increased, the transfer electric field at the secondary transfer nip part N is increased, but a discharge to the surface of the intermediate transfer belt 8 carrying the toner may occur. As a result, the toner is charged with opposite polarity, and hence secondary transfer efficiency is lowered. In order to improve the secondary transfer efficiency using a weak transfer electric field without increasing the applied voltage, it is effective to weaken non-electrostatic adhesion between the toner and the intermediate transfer belt 8.

The non-electrostatic adhesion between the toner and the intermediate transfer belt 8 is higher as the surface pressure between the intermediate transfer belt 8 and the photosensitive drum 1*a* to 1*d* at the primary transfer nip part is higher. One of reasons for this is considered that, if the surface pressure between the intermediate transfer belt 8 and the photosensitive drum 1*a* to 1*d* is high, the distance between the toner and the surface of the intermediate transfer belt 8 becomes small, which increases Van der Waals force exerting between the toner and the intermediate transfer belt 8.

Therefore, as a method of decreasing the surface pressure between the intermediate transfer belt 8 and the photosensitive drum 1*a* to 1*d*, there is adopted a method of disposing the primary transfer roller 6*a* to 6*d* offset from directly above the photosensitive drum 1*a* to 1*d* to the downstream side, in the moving direction of the intermediate transfer belt 8, and setting a lower spring load for pressing the primary transfer roller 6*a* to 6*d* to the photosensitive drum 1*a* to 1*d*.

Figure 7:
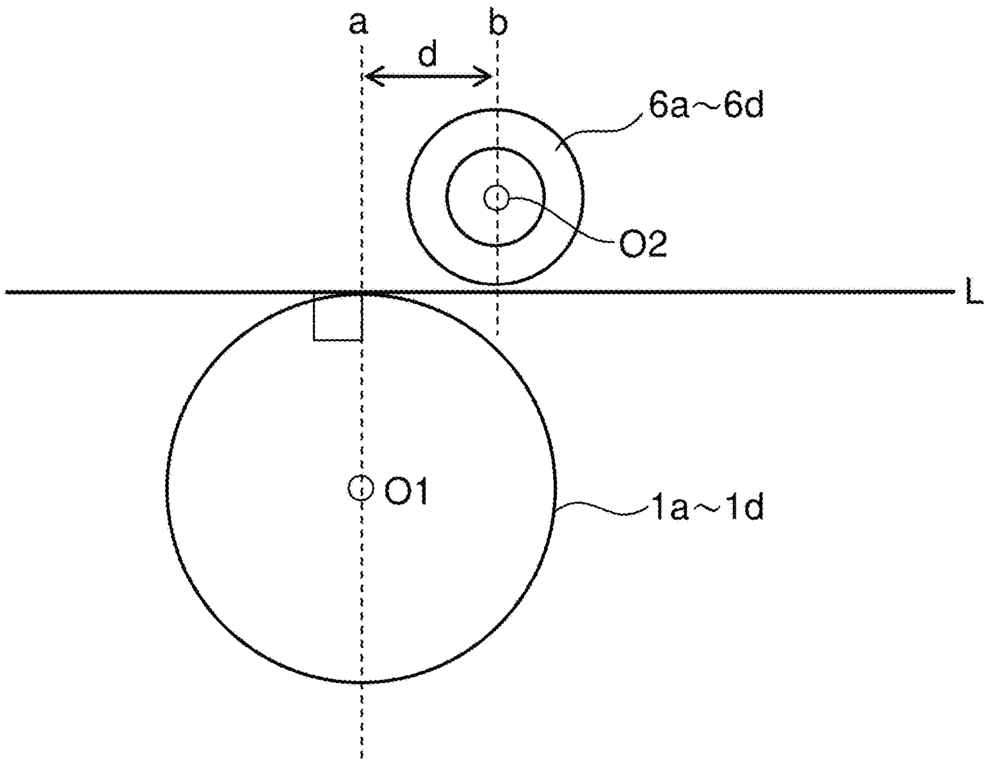
FIG. 7 is a side view illustrating a state where the primary transfer roller is disposed offset from a photosensitive drum.

FIG. 7 is a side view illustrating a state where the primary transfer roller 6*a* to 6*d* is disposed offset from the photosensitive drum 1*a* to 1*d*. With reference to FIG. 7, there is described a definition of an offset amount referred to in this specification.

When the intermediate transfer belt 8 is stretched in the state where the photosensitive drums 1*a* to 1*d* do not contact the primary transfer rollers 6*a* to 6*d*, respectively, the belt moving surface is denoted by L. In addition, the surface that is perpendicular to the belt moving surface L and passes through axis center O1 of the photosensitive drum 1*a* to 1*d* is denoted by a, and the surface that is parallel to the surface a and passes through axis center O2 of the primary transfer roller 6*a* to 6*d* is denoted by b. In this case, distance d between the surfaces a and b is defined as the offset amount. By setting the offset amount d to a predetermined value (e.g., 4 mm), good secondary transferability can be secured even if the surface of the paper sheet S has relatively large bumps and dips (like rough paper).

On the other hand, when the photosensitive drum 1*a* to 1*d* is used that has an amorphous silicon photosensitive layer as the photosensitive layer 19*b*, there is a problem that a white dot occurs in a solid image when the primary transfer roller 6*a* to 6*d* is disposed offset from the photosensitive drum 1*a* to 1*d*.

Therefore, in this embodiment, a defect of a transferred image in the primary transfer is suppressed, when using the photosensitive drum 1*a* to 1*d* having the amorphous silicon photosensitive layer, by defining ranges of the offset amount of the primary transfer roller 6*a* to 6*d*, a contact surface pressure between the intermediate transfer belt 8 and the photosensitive drum 1*a* to 1*d*, and a charge density of primary transfer current.

Hereinafter, transfer defect suppression effect is described, when defining the ranges of the offset amount of the primary transfer roller 6*a* to 6*d*, the contact surface pressure between the intermediate transfer belt 8 and the photosensitive drum 1*a* to 1*d*, and the charge density of primary transfer current, like this embodiment. As a test machine, the intermediate transfer type image forming apparatus 100 (manufactured by KYOCERA Document Solutions Japan Inc.) illustrated in FIG. 1 was used.

The intermediate transfer belt 8 has a thickness of 65 μm and is made of polyimide resin, and its both ends were stretched with a stretching tension of 30 (N) using springs. The surface resistance of the intermediate transfer belt 8 was set variable.

The primary transfer roller 6*a* to 6*d* is a sponge roller that has an outer diameter of 14 mm and is made of EPDM. The roller width (length in the axial direction) was 31.6 (cm), the hardness was 40 (degrees), the roller resistance was 7.8 (log Ω). The primary transfer roller 6*a* to 6*d* had a weight of 140 g, and the load of the primary transfer roller 6*a* to 6*d* was set variable by disposing springs on both sides in the axial direction. The primary transfer current flowing in the primary transfer roller 6*a* to 6*d* was set to −22 (μA).

The secondary transfer roller 9 is a sponge roller that has an outer diameter of 23 mm and is made of epichlorohydrin. The hardness was 40 (degrees), and the roller resistance was 7.0 (log Ω). The load of the secondary transfer roller 9 was 30 (N) of springs disposed on both sides in the axial direction. The secondary transfer voltage was applied to the drive roller 10 side (the side opposed to the secondary transfer roller 9), and the secondary transfer current flowing in the secondary transfer roller 9 was set to +90 (μA).

As the photosensitive drums 1*a* to 1*d*, two drums were used. One was an amorphous silicon photosensitive drum having an amorphous silicon layer as the photosensitive layer 19*b*, and the other was an OPC photosensitive drum, which has a positively charged single-layer OPC photosensitive layer as the photosensitive layer 19*b* (manufactured by KYOCERA Document Solutions Japan Inc. for both). The linear speed (process speed) of the photosensitive drums 1*a* to 1*d* was set to 32.2 (cm/sec). As the toner, a positively chargeable toner was used, and charge amount of each color toner was set to 20 to 50 (μC/g).

Relationship Among Offset Amount of Primary Transfer Roller, Belt Surface Resistance, and Image Defect First, occurrence of a discharge pattern was verified when changing the offset amount of the primary transfer roller 6*a* to 6*d* and the surface resistance of the intermediate transfer belt 8. As the test method, the offset amount of the primary transfer roller 6*a* to 6*d* was changed in seven steps from 0 to 6 (mm), and the surface resistance of the intermediate transfer belt 8 was changed in five steps from 9 to 11 (log Ω/square), and it was evaluated whether or not a transfer voltage (current) that does not generate a discharge pattern can be set, in the case of using the amorphous silicon photosensitive drum and the case of using the OPC photosensitive drum.

The discharge pattern is a spot-like pattern generated in a solid image, and a mechanism of generating a discharge pattern due to discharge is different depending on a type of the photosensitive drums 1*a* to 1*d*. More specifically, the amorphous silicon photosensitive drum may cause a white dot as a transfer defect, when the toner is reversely charged by the discharge. The OPC photosensitive drum may cause a black dot as transfer memory, when the photosensitive layer of the photosensitive drum is reversely charged by the discharge, and the charging device cannot eliminate hysteresis thereof.

Evaluation criteria are as follows. If sufficient primary transfer can be performed, and if the primary transfer voltage (current) that does not generate a discharge pattern can be set, the evaluation is "Good". If discharge occurs when the primary transfer voltage is increased, while a transfer defect occurs when the primary transfer voltage is decreased, and if the primary transfer voltage (current) cannot be set, the evaluation is "NG". The result in the case of using the amorphous silicon photosensitive drum is shown in Table 1, and the result in the case of using the OPC photosensitive drum is shown in Table 2.

TABLE 1

| | | surface resistance of intermediate transfer belt (logΩ/square) | | | | |
|---|---|---|---|---|---|---|
| | | 9 | 9.5 | 10 | 10.5 | 11 |
| offset amount (mm) | 0 | Good | Good | Good | Good | NG |
| | 1 | Good | Good | Good | Good | NG |
| | 2 | Good | Good | Good | Good | NG |
| | 3 | Good | Good | Good | NG | NG |
| | 4 | Good | Good | Good | NG | NG |
| | 5 | Good | Good | NG | NG | NG |
| | 6 | Good | Good | NG | NG | NG |

TABLE 2

| | | surface resistance of intermediate transfer belt (logΩ/square) | | | | |
|---|---|---|---|---|---|---|
| | | 9 | 9.5 | 10 | 10.5 | 11 |
| offset amount (mm) | 0 | Good | Good | Good | Good | NG |
| | 1 | Good | Good | Good | Good | NG |
| | 2 | Good | Good | Good | Good | NG |
| | 3 | Good | Good | Good | Good | NG |
| | 4 | Good | Good | Good | Good | NG |
| | 5 | Good | Good | Good | Good | NG |
| | 6 | Good | Good | Good | NG | NG |

As obvious from Table 1 and Table 2, if the offset amount of the primary transfer roller 6*a* to 6*d* is 3 mm or more, a range of the surface resistance of the intermediate transfer belt 8 that can be used is 9 to 10 (log Ω/square) in the case of using the amorphous silicon photosensitive drum, while it is 9 to 10.5 (log Ω/square) in the case of using the OPC photosensitive drum. It is understood that the range is narrower in the case of using the amorphous silicon photosensitive drum than in the case of using the OPC photosensitive drum.

Next, a relationship among the primary transfer current, the primary transferability, and the secondary transferability is described. Under conditions in which the process linear speed is 32.2 (cm/sec), and the roller width of the primary transfer roller 6*a* to 6*d* is 31.6 (cm), a sufficient toner transfer amount was obtained when the primary transfer current is 16 (μA) or more.

In addition, in the tandem type image forming apparatus 100 in which the image forming units Pa to Pd are arranged in parallel along the intermediate transfer belt 8, if the primary transfer current becomes 40 (μA) or more, when the toner primarily transferred onto the intermediate transfer belt 8 passes through the image forming unit on the downstream side, the toner charge amount increases excessively, which generates a secondary transfer defect.

On the basis of the relationship described above, when converting the primary transfer current into the charge density, as charge density (μC/cm$^2$)=current (μC)/(linear speed (cm/sec)×roller width (cm)) holds, 16 (μA)/(32.2 (cm/sec)×31.6 (cm))=0.016 (μC/cm$^2$) holds, and 40 (μA)/(32.2 (cm/sec)×31.6 (cm))=0.040 (μC/cm$^2$) holds. Thus, it is confirmed that a current density region from 0.016 to 0.040 (μC/cm$^2$) is preferable.

Figure 8:
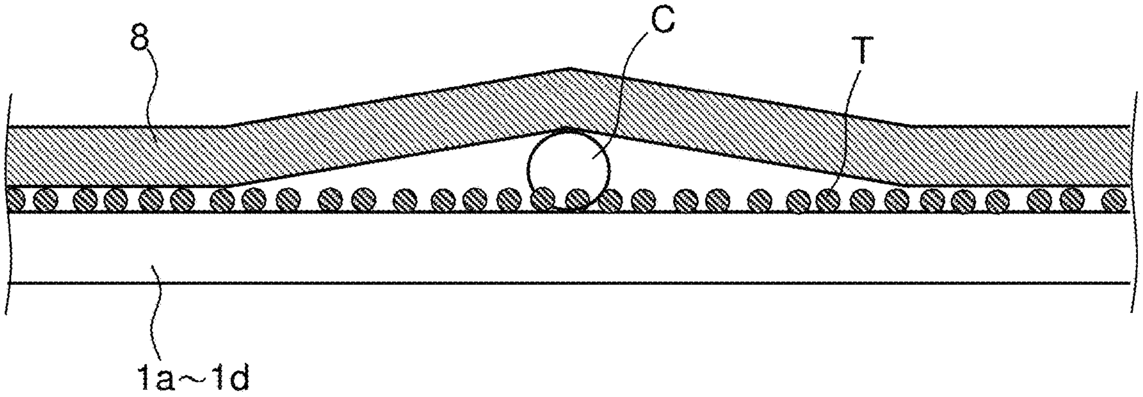
FIG. 8 is a cross-sectional side view illustrating a state where a foreign particle has entered between the photosensitive drum and the intermediate transfer belt.

On the other hand, a lower limit region of the surface resistance of the intermediate transfer belt 8 is restricted also from another viewpoint than the discharge. FIG. 8 is a cross-sectional side view illustrating a state where a foreign particle C has entered between the intermediate transfer belt 8 and the photosensitive drum 1*a* to 1*d* (in the primary transfer nip part). When using the plastic belt as the intermediate transfer belt 8, if the foreign particle C having a larger diameter than the toner T (such as carrier or an agglomerate of toner) enters in the primary transfer nip part, a gap is formed around the foreign particle C as illustrated in FIG. 8. In the gap and its vicinity, the primary transfer electric field is weakened, and hence a white defect (a white dot) is generated in the image.

If the primary transfer voltage (primary transfer current) of a certain level or more is applied, the toner flies away over the gap, and a white dot does not occur. However, as the surface resistance of the intermediate transfer belt 8 is lower, the applied primary transfer current leaks more in the belt surface direction, and the white dot tends to be more obvious. Therefore, occurrence of a white dot due to carrier adhesion was verified when changing the offset amount of the primary transfer roller 6*a* to 6*d* and the surface resistance of the intermediate transfer belt 8. The result is shown in Table 3.

TABLE 3

| | | surface resistance of intermediate transfer belt (logΩ/square) | | | | |
|---|---|---|---|---|---|---|
| | | 9 | 9.5 | 10 | 10.5 | 11 |
| offset amount (mm) | 0 | NG | Good | Good | Good | Good |
| | 1 | NG | Good | Good | Good | Good |
| | 2 | NG | Good | Good | Good | Good |
| | 3 | NG | Good | Good | Good | Good |
| | 4 | NG | Good | Good | Good | Good |
| | 5 | NG | Good | Good | Good | Good |
| | 6 | NG | Good | Good | Good | Good |

As obvious from Table 3, when the surface resistance of the intermediate transfer belt 8 is 9 (log Ω/square) or less, the primary transfer voltage (current) cannot be set that does not generate a white dot regardless of the offset amount.

From the results of Table 1 and Table 3, the range of the surface resistance of the intermediate transfer belt 8 that can be used is 9.5 to 10.0 (log Ω/square) when the offset amount is 3 to 4 mm, and it is 9.5 to 10.5 (log Ω/square) when the offset amount is 0 to 2 mm. Here, when manufacturing the plastic belt, it is necessary to secure a resistance tolerance (margin) of 1 digit range (1 log Ω/square). Therefore, if the offset amount is 3 to 4 mm, the resistance tolerance cannot be secured, while if the offset amount is 2 mm or less, it can be secured.

Relationship Among Offset Amount of Primary Transfer Roller, Contact Surface Pressure in Primary Transfer Nip Part, and Secondary Transfer Defect Next, a relationship among the offset amount of the primary transfer roller 6*a* to 6*d*, the contact surface pressure between the intermediate transfer belt 8 and the photosensitive drum 1*a* to 1*d*, and the secondary transferability was examined. The test method was as follows. The offset amount of the primary transfer roller 6*a* to 6*d* was changed in a range from 0 to 4 (mm), and the contact surface pressure between the intermediate transfer belt 8 and the photosensitive drum 1*a* to 1*d* was changed in a range from 1 to 3.5 (gf/mm$^2$), and a rough paper sheet was used as the paper sheet. Then it was evaluated whether or not sufficient secondary transferability was obtained. As the paper sheet S, an A4 size rough paper sheet having basis weight of 80 g/m$^2$ (Nautilus paper manufactured by Mondi PLC) was used. The result is shown in FIG. 9.

Figure 9:
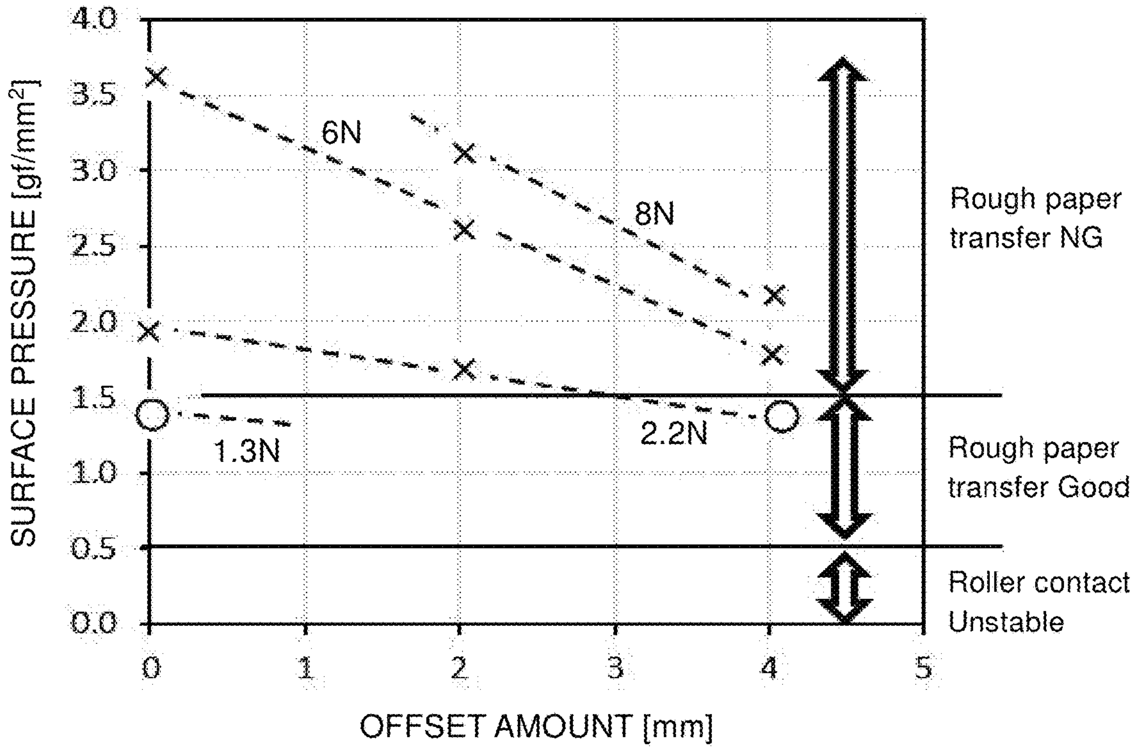
FIG. 9 is a graph illustrating a relationship among an offset amount of the primary transfer roller, a contact surface pressure between the photosensitive drum and the intermediate transfer belt, and secondary transferability, when the offset amount and the contact surface pressure are changed.

In FIG. 9, the vertical axis represents the contact surface pressure (gf/mm$^2$) between the intermediate transfer belt 8 and the photosensitive drum 1*a* to 1*d* (in the primary transfer nip part), when the offset amount and a spring pressure are combined. The contact surface pressure was measured using a surface pressure distribution measurement system (I-SCAN manufactured by NITTA Co, Ltd.). In FIG. 9, broken lines are lines connecting the same conditions of the spring pressure (1.3, 2.2, 6, 8 (N)) on one end used as the load of the primary transfer roller 6*a* to 6*d*. In FIG. 9, "○" indicates the evaluation "Good", while "x" indicates the evaluation "NG" of a transferred image onto the rough paper sheet.

As understood from the result shown in FIG. 9, the transferred image onto the rough paper sheet was good when the contact surface pressure was 1.5 (gf/mm$^2$) or less, while in the region of the contact surface pressure more than 1.5 (gf/mm$^2$), the transfer efficiency was lowered, and the image looked rough. In addition, in the region of the contact surface pressure of 0.5 (gf/mm$^2$) or less, contact between the intermediate transfer belt 8 and the primary transfer roller 6*a* to 6*d* was unstable, and a hollow defect image occurred.

As described above, in the image forming apparatus 100 including an amorphous silicon photosensitive drum as the photosensitive drums 1*a* to 1*d*, and a plastic belt as the intermediate transfer belt 8, it is possible to secure primary transferability of a toner image onto the intermediate transfer belt 8, and secondary transferability of a toner image onto a rough paper sheet, and to effectively suppress occurrence of an image defect such as a ghost, a white dot, or a black dot, by setting the offset amount of the primary transfer roller 6*a* to 6*d* to 0 to 2 (mm), the contact surface pressure between the intermediate transfer belt 8 and the photosensitive drums 1*a* to 1*d* to 0.5 to 1.5 (gf/mm$^2$), and the charge density of primary transfer current to 0.016 to 0.040 (μC/cm$^2$).

In addition, it is possible to use a plastic belt, which is inexpensive and is superior in dimensional stability, as the intermediate transfer belt 8, and to use a long-life amorphous silicon photosensitive drum as the photosensitive drum 1*a* to 1*d*, and hence it is possible to provide the image forming apparatus 100 that has high image quality and can perform high-speed printing.

Other than that, the present disclosure is not limited to the embodiment described above, but can be variously modified within the scope of the present disclosure without deviating from the spirit thereof. For instance, the present disclosure can be applied not only to the tandem type color printer illustrated in FIG. 1, but also to various types of image forming apparatuses such as a color copier and a color multifunction peripheral, using an intermediate transfer method in which a toner image formed on a photosensitive drum is primarily transferred onto an intermediate transfer belt.

The present disclosure can be applied to an intermediate transfer type image forming apparatus in which a toner image formed on an image carrier such as a photosensitive drum is transferred onto an intermediate transfer belt. Utilizing the present disclosure, it is possible to prevent a transfer defect due to discharge, and to suppress lowering of secondary transferability even if the paper sheet has a rough surface, and thus it is possible to provide an image forming apparatus that can form high quality images for a long period.

What is claimed is:

1. An image forming apparatus comprising:

a plurality of image carriers each of which has a surface on which an amorphous silicon photosensitive layer is formed;

a charging device that charges the surface of the image carrier;

an exposure device that exposes the surface of the image carrier charged by the charging device, so as to form an electrostatic latent image on the surface of the image carrier;

a development device that develops the electrostatic latent image formed on the surface of the image carrier into a toner image, using developer containing toner;

an intermediate transfer belt onto which the toner images formed on the image carriers are primarily transferred sequentially;

a plurality of primary transfer rollers each of which is pressed to contact the image carrier via the intermediate transfer belt; and a secondary transfer roller that secondarily transfers the toner images, which have been primarily transferred onto the intermediate transfer belt, to the recording medium, wherein the intermediate transfer belt is a plastic belt having a surface resistivity of 9.5 to 10.5 log Ω/square, an offset amount of the primary transfer roller from the image carrier is 0 to 2 mm, a contact surface pressure between the image carrier and the intermediate transfer belt is 0.5 to 1.5 gf/mm$^2$, and a charge density of primary transfer current that flows when the primary transfer voltage is applied to the primary transfer roller is 0.016 to 0.040 μC/cm$^2$.

2. The image forming apparatus according to claim 1, wherein the intermediate transfer belt is made of polyimide resin as a main component and has a thickness of 40 to 100 μm and a Young's modulus of 3,000 to 6,000 MPa.

3. The image forming apparatus according to claim 1, wherein the development device is a two-component developing type using two-component developer containing the toner and carrier.

* * * * *